US012704009B2

(12) United States Patent
Zhang

(10) Patent No.: US 12,704,009 B2
(45) Date of Patent: Aug. 11, 2026

(54) DUAL-PURPOSE DOOR STOPPER USED FOR HAIR AND SMOOTH SURFACES

(71) Applicant: Ningbo Hyderon Hardware Co., Ltd., Yuyao (CN)

(72) Inventor: Lifeng Zhang, Yuyao (CN)

(73) Assignee: Ningbo Hyderon Hardware Co., Ltd., Yuyao (CN)

( * ) Notice: Subject to any disclaimer, the term of this patent is extended or adjusted under 35 U.S.C. 154(b) by 38 days.

(21) Appl. No.: 18/895,455

(22) Filed: Sep. 25, 2024

(65) Prior Publication Data

US 2026/0035970 A1 Feb. 5, 2026

(30) Foreign Application Priority Data

Jul. 30, 2024 (CN) ......................... 202411032213.2

(51) Int. Cl.
*E05C 17/54* (2006.01)

(52) U.S. Cl.
CPC .................................... *E05C 17/54* (2013.01)

(58) Field of Classification Search
CPC ................................. E05C 17/54; E05C 17/56
USPC ........................................................... 292/343
See application file for complete search history.

(56) References Cited

U.S. PATENT DOCUMENTS 5,468,032 A * 11/1995 Hebert .................... E05C 17/54 292/343
5,711,560 A * 1/1998 Gilbertson .............. E05C 17/54 292/343
7,784,751 B1 * 8/2010 Bellows ................. A47B 91/00 248/346.11
7,907,052 B2 * 3/2011 Delaney, Jr. ........... A62C 99/00 340/331
7,976,080 B1 * 7/2011 Duff ........................ E05C 17/54 292/343
2011/0062729 A1 * 3/2011 Ruggerio ................ E05C 17/54 292/343
2011/0140463 A1 * 6/2011 Nalepka .................. E05C 17/56 292/344

* cited by examiner

*Primary Examiner* — Nathan Cumar

(57) ABSTRACT

A door stopper used for hair and smooth surfaces comprising a rigid inner core; the rigid inner core is configured to be a slope structure; a concave surface at one end of the bottom surface of the end portion of the rigid inner core is provided with a rubber-coated positioning ring for positioning during the injection molding process; a circular soft magnet sheet is embedded in a lower end surface of the rigid inner core; the carpet claw may be assembled in and disassembled from the clamping groove of the outer anti-sliding body, and the outer anti-sliding body wraps the rigid inner core first and then is embedded into the carpet claw; the rubber-coated positioning ring is used for positioning the outer anti-sliding body during injection molding, and the soft magnet sheet is embedded in the outer anti-sliding body with one side exposed for being in contact with the outside.

7 Claims, 1 Drawing Sheet

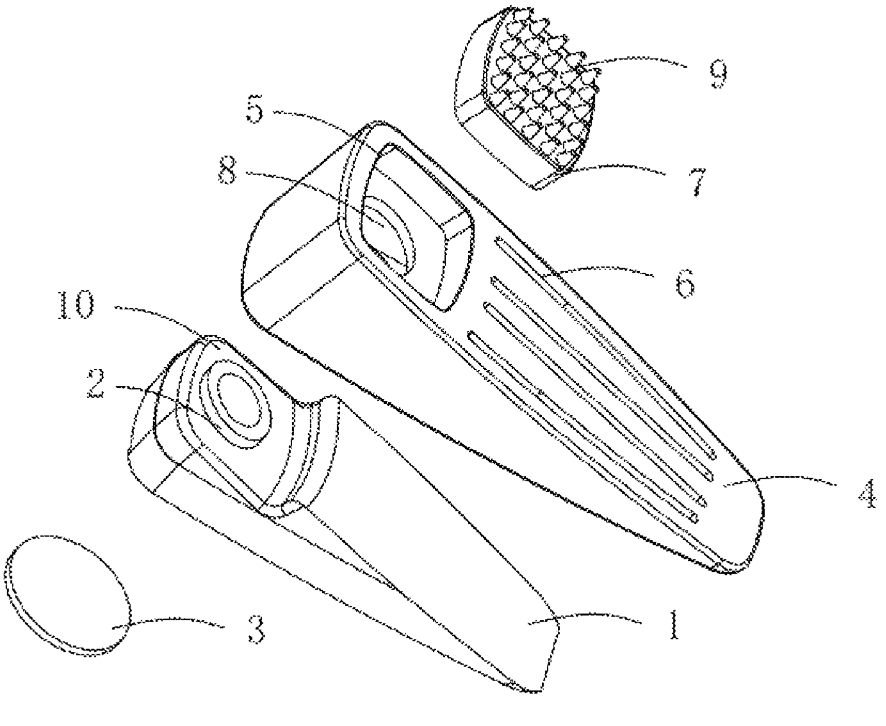
9
5
8
7
6
10
2
4
3
1

DUAL-PURPOSE DOOR STOPPER USED FOR HAIR AND SMOOTH SURFACES

TECHNICAL FIELD

This invention generally relates to the technical field of door stoppers, and more particularly, to a dual-purpose door stopper used for hair and smooth surfaces.

BACKGROUND

To prevent a door protected by a code lock or mechanical lock from being illegally unlocked, a mechanical double-locking mechanism is normally equipped. The mechanical double-locking mechanism includes a plug-in seat arranged on the wall body and a plug-in member arranged on the door body. The plug-in member is connected to the door body through a chain. By means of inserting the plug-in member into the plug-in seat, the safety is significantly improved. However, most of the doors are not equipped with the aforesaid mechanical double-locking mechanism, which prevent people outside the door from entering by using a door stopper with a simple structure. Conventional door stoppers comprise a door stopper body, wherein the door stopper body is provided with an abutting plane in contact with the floor and an abutting slope intersecting with the abutting plane for abutting against a lower edge of the door. When the door is opened, the lower edge of the door abuts against the abutting slope, and the door stopper body prevents the door from being further opened by means of the frictional force between the floor and the abutting plane. However, when the floor is smooth and the opening force is large, the door stopper may be pushed by the door to slide, resulting in a failure of the door stopper.

Chinese patent CN220909415U discloses a door stopper, comprising a rubber body, wherein the bottom of the rubber body is provided with a mounting plane, the mounting plane is fixedly provided with a plurality of suction members, and the plurality of suction members are distributed at intervals on the mounting plane. The suction member is provided with a downward suction surface, and the rubber body is provided with an abutting slope obliquely arranged relative to the mounting plane. A wedge-shaped plug-in end portion is formed at a junction of the abutting slope and the mounting plane, and the plug-in end portion is configured to abut between a lower edge of the door and the floor. After the door stopper is mounted on the floor, the suction surface is attached to the floor, and when the door is opened, the plug-in end portion enters between the lower edge of the door and the floor. Along the increase of the opening angle of the door, the lower edge of the door moves from bottom to top along the abutting slope until the rubber body elastically deforms to be tightly fitted between the lower edge of the door and the floor. During the process, a large suction force is generated between the plurality of suction members and the floor to prevent the door stopper from moving relative to the floor, thereby significantly improving the safety.

In the aforesaid technical solution, a suction cup abuts against the floor to make an arc-sharped concave surface deform such that the air between the suction surface and the floor is exhausted. Under the action of the pressure difference between the atmosphere and the inner chamber formed between the suction surface and the floor, the suction cup keeps sucking the floor, thus achieving better suction effect compared with other suction members. However, when in use, the aforesaid door stopper can only be used on a smooth and flat floor instead of a carpeted floor, and the stopping effect is poor.

SUMMARY

The purpose of the present invention is to provide a dual-purpose door stopper used for hair and smooth surfaces.

To achieve the above purpose, the present invention adopts the following technical solution: a door stopper used for hair and smooth surfaces comprises a rigid inner core, wherein the rigid inner core is configured to be a slope structure; a concave surface at one end of the bottom surface of the end portion of the rigid inner core is provided with a rubber-coated positioning ring for positioning during the injection molding process; a circular soft magnet sheet is embedded in a lower end surface of the rigid inner core; the door stopper further comprises an outer anti-sliding body, wherein one end of the outer anti-sliding body facing an inclined surface on one side of the outer anti-sliding body is recessed downwards to form a clamping groove; the bottom surface of the outer anti-sliding body is provided with an inner core assembly chamber for mounting and fixing the rigid inner core; a carpet claw in contact with the hair surface and smooth surface for achieving the anti-sliding purpose is clamped inside the clamping groove.

In a preferred embodiment of the present invention, the outer anti-sliding body is sleeved outside the rigid inner core by means of the inner core assembly chamber. The central position of an inner bottom surface of the clamping groove is provided with a circular positioning hole for allowing the rubber-coated positioning ring to penetrate through and is positioned therein, thereby enabling the outer anti-sliding body and the rigid inner core to be integrated into a whole by means of the inner core assembly chamber.

In a preferred embodiment of the present invention, the carpet claw is clamped inside the clamping groove and is positioned on the rubber-coated positioning ring, and the surface of the carpet claw is uniformly provided with conical claw bodies, thereby enabling the door stopper to be in contact with the hair surface to generate a holding force such that the door stopper is firmly in contact with the hair surface.

In a preferred embodiment of the present invention, one end of the surface of the rigid inner core is provided with a positioning concave surface, and the rubber-coated positioning ring is arranged at the central position of the positioning concave surface, thereby allowing the rigid inner core to be firmly and stably arranged inside the outer anti-sliding body such that the separation phenomenon is avoided.

In a preferred embodiment of the present invention, the inclined surface of one side of the outer anti-sliding body is provided with blocking ribs for enabling the outer anti-sliding body to be in contact with the smooth surface to stop the door body. The blocking ribs are configured to be a strip-shaped protruding structure and are uniformly arranged on the surface of the outer anti-sliding body, thereby enabling the door stopper to be better in contact with the smooth surface by using the blocking ribs such that an ideal anti-sliding effect is achieved.

In a preferred embodiment of the present invention, the inner chamber of the clamping groove extends downward to an inner end of the inner core assembly chamber, and one side of the positioning concave surface is configured to be an arc-shaped inner wall, which is clamped to a surface of an outer side of the clamping groove, thereby better fixing the rigid inner core and the outer anti-sliding body.

Compared with the prior art, the present invention has the following advantages: the dual-purpose door stopper used for hair and smooth surfaces achieves the stopping effect by means of the combination of the rigid inner core, the outer anti-sliding body, the clamping groove formed in the surface of the outer anti-sliding body, the carpet claw, the conical claw bodies and the blocking ribs; the carpet claw may be assembled in and disassembled from the clamping groove of the outer anti-sliding body, and the outer anti-sliding body wraps the rigid inner core first and then is embedded into the carpet claw; the rubber-coated positioning ring is used for positioning the outer anti-sliding body during injection molding, and the soft magnet sheet is embedded in the outer anti-sliding body with one side exposed for being in contact with the outside; the door stopper may be used for both a hair surface and a smooth surface and is made of a rigid material; the carpet claw may be disassembled; the door stopper is configured to be assembled, the outer anti-sliding body uses blocking ribs and wraps the rigid inner core, further improving the use effect on the smooth floor.

BRIEF DESCRIPTION OF THE DRAWINGS

FIG. 1 is a schematic diagram illustrating an explosive view of the present invention;

In FIGURES: 1—Rigid Inner Core, 2—Rubber-coated Positioning Ring, 3—Soft Magnet Sheet, 4—Outer Anti-sliding Body, 5—Clamping Groove, 6—Blocking Rib, 7—Carpet Claw, 8—Circular Positioning Hole, 9—Conical Claw Body, 10—Positioning Concave Surface.

DETAILED DESCRIPTION

While specific embodiments of the invention have been described in detail, it will be appreciated by those skilled in the art that various modifications and alternatives to those details could be developed in light of the overall teachings of the present invention. Accordingly, the particular arrangements disclosed are meant to be illustrative only and not limiting as to the scope of the invention which is to be given the full breadth of the claims appended and any and all equivalents thereof.

Referring to FIG. 1, the present invention provides a dual-purpose door stopper for hair and smooth surfaces. The door stopper of the present invention comprises a rigid inner core 1, wherein the rigid inner core 1 is configured to be a slope structure, and the rigid inner core 1 is made of a rigid material and is integrally formed by using an injection molding method. Through adopting the aforesaid, the overall strength of the door stopper is significantly improved. A concave surface at one end of the bottom surface of the end portion of the rigid inner core 1 is provided with a rubber-coated positioning ring 2 for positioning during the injection molding process. A circular soft magnet sheet 3 is embedded in a lower end surface of the rigid inner core 1 for allowing the door stopper to be attracted to a door surface or wall surface when not used. In addition, the soft magnet sheet 3 has a certain elastic bending degree, which effectively protects the soft magnet sheet 3 against damage and breakage.

The door stopper of the present invention further comprises an outer anti-sliding body 4, wherein one end of the outer anti-sliding body 4 facing an inclined surface on one side of the outer anti-sliding body 4 is recessed downwards to form a clamping groove 5, and the clamping groove 5 and the outer anti-sliding body 4 are integrally injection-molded. In addition, an inner side wall of the clamping groove 5 has an arc-shaped angle, which allows a carpet claw 7 to be clamped inside the clamping groove. Moreover, the bottom surface of the outer anti-sliding body 4 is provided with an inner core assembly chamber for mounting and fixing the rigid inner core 1, thereby enabling the rigid inner core 1 to be wrapped by the outer anti-sliding body 4 to stop the door body. The carpet claw 7 in contact with the hair surface and smooth surface for achieving the anti-sliding purpose is clamped inside the clamping groove 5. By means of the aforesaid, when one side of the door stopper provided with the carpet claw 7 is in contact with the surface of the carpet, the stability of the door body after being stopped is ensured.

The outer anti-sliding body 4 is sleeved outside the rigid inner core 1 by means of the inner core assembly chamber. In this way, the rigid inner core 1 possesses the function of stopping and fixing the door body. The central position of an inner bottom surface of the clamping groove 5 is provided with a circular positioning hole 8 for allowing the rubber-coated positioning ring 2 to penetrate through and is positioned therein. Thus, the rigid inner core 1 achieves the positioning function and the outer anti-sliding body 4 is prevented from falling off. The carpet claw 7 is clamped inside the clamping groove 5 and is positioned on the rubber-coated positioning ring 2, and the surface of the carpet claw 7 is uniformly provided with conical claw bodies 9. By means of the conical claw bodies 9, the door stopper generates a holding force and is positioned on the hair surface of the carpet. Thus, the sliding phenomenon of the door body is avoided.

One end of the surface of the rigid inner core 1 is provided with a positioning concave surface 10, and the rubber-coated positioning ring 2 is arranged at the central position of the positioning concave surface 10, thereby integrating the rigid inner core 1 and the outer anti-sliding body 4 into a whole. The inclined surface of one side of the outer anti-sliding body 4 is provided with blocking ribs 6 for enabling the outer anti-sliding body 4 to be in contact with the smooth surface to stop the door body. By means of the blocking ribs 6, when the door stopper is in contact with the smooth surface, a frictional resistance is generated, making the door stopper more stable and firm on the smooth surface. The blocking ribs 6 are configured to be a strip-shaped protruding structure and are uniformly arranged on the surface of the outer anti-sliding body 4. The inner chamber of the clamping groove 5 extends downward to an inner end of the inner core assembly chamber, and one side of the positioning concave surface 10 is configured to be an arc-shaped inner wall, which is clamped to a surface of an outer side of the clamping groove 5.

More specifically, during use, the outer anti-sliding body 4 is integrally sleeved with the rigid inner core 1 through the inner core assembly chamber, and the rubber-coated positioning ring 2 penetrates through the circular positioning hole 8 and is positioned and fixed in the inner core assembly chamber. The soft magnet sheet 3 is embedded on one side of the rigid inner core 1, and the carpet claw 7 with the conical claw bodies 9 is clamped inside the clamping groove 5. When in use, the front side of the door stopper provided with the carpet claw 7 is fixed downwards to the hair surface, and the slope structure of the door stopper abuts against the gap between the door body and the floor such that the door body is fixed. Contrarily, the back side of the door stopper abuts downwards against the gap between the door body and the floor and is in contact with the smooth surface such that the door body is fixed. Moreover, the soft magnet sheet 3 plays a role of storage and is capable of being attracted to the door surface or wall surface when the door stopper is not used, thereby significantly widening the application range of the present invention.

The above are merely preferred embodiments of the present invention, and the scope of the present invention is not limited to the embodiments described above. Although the present invention is described in detail with reference to the above embodiments, for those skilled in the art, the technical solutions described in the embodiments may still be modified, or some of the technical features may be equivalently replaced. Therefore, any modification, equivalent replacement, or improvement made without departing from the spirit and principle of the present invention shall fall within the scope defined by the claims of the present invention.

What is claimed is:

1. A door stopper used for hair and smooth surfaces, comprising: a rigid inner core (1), wherein the rigid inner core (1) is configured to be a slope structure, wherein a concave surface at one end of a top surface of the rigid inner core (1) is provided with a rubber-coated positioning ring (2), wherein a circular soft magnet sheet (3) is embedded in a bottom surface of the rigid inner core (1), wherein the door stopper further comprises: an outer anti-sliding body (4), wherein one end of a top surface of the outer anti-sliding body (4) facing an inclined surface on one side of the outer anti-sliding body (4) is recessed downwards to form a clamping groove (5), wherein a bottom surface of the outer anti-sliding body (4) is provided with an inner core assembly chamber for mounting and fixing the rigid inner core (1), and wherein a carpet claw (7) in contact with the hair surface and smooth surfaces for achieving the anti-sliding purpose is clamped inside the clamping groove (5), wherein the top surface of the outer anti-sliding body (4) is provided with blocking ribs (6) for enabling the outer anti-sliding body (4) to be in contact with a smooth surface to stop a door body, wherein the clamping groove (5), the carpet claw (7), and the blocking ribs (6) are all located on the same top surface of the outer anti-sliding body (4) opposite the inner core assembly chamber.

2. The door stopper used for hair and smooth surfaces of claim 1, wherein the outer anti-sliding body (4) is sleeved outside the rigid inner core (1) by means of the inner core assembly chamber, and wherein the central position of an inner bottom surface of the clamping groove (5) is provided with a circular positioning hole (8) for allowing the rubber-coated positioning ring (2) to penetrate through and is positioned therein, one side of the soft magnet sheet (3) is exposed for being in contact with outside.

3. The door stopper used for hair and smooth surfaces of claim 1, wherein the carpet claw (7) is clamped inside the clamping groove (5) and is positioned on the rubber-coated positioning ring (2), and the surface of the carpet claw (7) is uniformly provided with conical claw bodies (9).

4. The door stopper used for hair and smooth surfaces of claim 1, wherein one end of the surface of the rigid inner core (1) is provided with a positioning concave surface (10), and the rubber-coated positioning ring (2) is arranged at the central position of the positioning concave surface (10).

5. The door stopper used for hair and smooth surfaces of claim 1, wherein the inclined surface of one side of the outer anti-sliding body (4) is provided with blocking ribs for enabling the outer anti-sliding body (4) to be in contact with the smooth surface to stop the door body, and wherein the blocking ribs (6) are configured to be a strip-shaped protruding structure and are uniformly arranged on the top surface of the outer anti-sliding body (4).

6. The door stopper used for hair and smooth surfaces of claim 4, wherein the inner chamber of the clamping groove (5) extends downward to an inner end of the inner core assembly chamber, and one side of the positioning concave surface (10) is configured to be an arc-shaped inner wall, which is clamped to a surface of an outer side of the clamping groove (5).

7. The door stopper used for hair and smooth surfaces of claim 1, wherein the conical claw bodies (9) of the carpet claw (7) are configured to penetrate into carpet fibers to generate a holding force when the top surface is placed downward on a hair surface, and wherein the blocking ribs (6) are configured to elastically deform against a smooth surface to generate frictional resistance when the top surface is placed downward on the smooth surface.

* * * * *